United States Patent
Mueller et al.

[19]

[11] Patent Number: 6,072,511
[45] Date of Patent: Jun. 6, 2000

[54] METHOD AND APPARATUS FOR DIODE-LASER IMAGING WITH COMPENSATION FOR OUTPUT VARIATIONS

[75] Inventors: Wayne Mueller; John F. Kline, both of Londonderry; Glenn E. Cabana, Derry; John Gary Sousa, Hudson, all of N.H.

[73] Assignee: Presstek, Inc., Hudson, N.H.

[21] Appl. No.: 08/990,115

[22] Filed: Dec. 12, 1997

[51] Int. Cl.$^7$ ...................................................... B41J 2/385
[52] U.S. Cl. ............................ 347/131; 347/233; 347/258
[58] Field of Search .................................... 347/234, 238, 347/258, 131, 132, 133, 139, 143, 144, 153, 232; 346/138, 139 D, 134; 358/300, 296, 298; 101/467, 457, 136

[56] References Cited

U.S. PATENT DOCUMENTS 5,174,205  12/1992  Kline et al. ............................... 101/136
5,822,345  10/1998  Sousa et al. ............................... 372/38

FOREIGN PATENT DOCUMENTS

0710005A2  5/1996  European Pat. Off. .
0818858A2  1/1998  European Pat. Off. .
WO97/27065  7/1997  WIPO .

*Primary Examiner*—N. Le
*Assistant Examiner*—Shih-Wen Hsieh
*Attorney, Agent, or Firm*—Cesari and McKenna, LLP

[57] ABSTRACT

Compensation for the effects of duty cycle on the output level of an imaging device, and for the effects of periodically varying distance between the output of the imaging device and its target, is accomplished electronically. An exemplary apparatus includes a source of radiation (generally a laser) having an output level that varies both with an input power level and, undesirably, with the duty cycle. The radiation source is operated to produce, on the recording surface, an imagewise pattern of spots, and an adjustment facility compensates for output-level variations resulting from duty cycle—that is, from the recent pattern of laser activity.

17 Claims, 7 Drawing Sheets

METHOD AND APPARATUS FOR DIODE-LASER IMAGING WITH COMPENSATION FOR OUTPUT VARIATIONS

FIELD OF THE INVENTION

The present invention relates to digital printing apparatus and methods, and more particularly to a system for imaging lithographic printing members on- or off-press using digitally controlled laser output.

BACKGROUND OF THE INVENTION

In offset lithography, a printable image is present on a printing member as a pattern of ink-accepting (oleophilic) and ink-repellent (oleophobic) surface areas. Once applied to these areas, ink can be efficiently transferred to a recording medium in the imagewise pattern with substantial fidelity. Dry printing systems utilize printing members whose ink-repellent portions are sufficiently phobic to ink as to permit its direct application. Ink applied uniformly to the printing member is transferred to the recording medium only in the imagewise pattern. Typically, the printing member first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing member corresponding to each color is required. The original image is decomposed into a series of imagewise patterns, or "separations," that each reflect the contribution of the corresponding printable color. The positions of the printing members are coordinated so that the color components printed by the different members will be in register on the printed copies. Each printing member ordinarily is mounted on (or integral with) a "plate" cylinder, and the set of cylinders associated with a particular color on a press is usually referred to as a printing station.

To circumvent the cumbersome photographic development, plate-mounting and plate-registration operations that typify traditional printing technologies, practitioners have developed electronic alternatives that store the imagewise pattern in digital form and impress the pattern directly onto the plate. Plate-imaging devices amenable to computer control include various forms of lasers. For example, U.S. Pat. Nos. 5,351,617 and 5,385,092 disclose ablative recording systems that use low-power laser discharges to remove, in an imagewise pattern, one or more layers of a lithographic printing blank, thereby creating a ready-to-ink printing member without the need for photographic development. In accordance with those systems, laser output is guided from the diode to the printing surface and focused onto that surface (or, desirably, onto the layer most susceptible to laser ablation, which will generally lie beneath the surface layer). Other systems use laser energy to cause transfer of material from a donor to an acceptor sheet, to record non-ablatively, or as a pointwise alternative to overall exposure through a photomask or negative.

As discussed in the '617 and '092 patents, laser output can be generated remotely and brought to the recording blank by means of optical fibers and focusing lens assemblies. It is important, when focusing radiation onto the recording blank, to maintain satisfactory depth-of-focus—that is, the tolerable deviation from perfect focus on the recording surface. Adequate depth-of-focus is important to construction and use of the imaging apparatus; the smaller the working depth-of-focus, the greater will be the need for fine mechanical adjustments and vulnerability to performance degradation due to the alignment shifts that can accompany normal use. Depth-of-focus is maximized by keeping output beam divergence to a minimum.

Unfortunately, optical efforts to reduce beam divergence also diminish power density, since a lens cannot alter the brightness of the radiation it corrects; a lens can only change the optical path. Thus, optical correction presents an inherent tradeoff between depth-of-focus and power loss. U.S. Pat. No. 5,822,345 discloses an approach that utilizes the divergent output of a semiconductor or diode laser to optically pump a laser crystal, which itself emits laser radiation with substantially less beam divergence but comparable power density; the laser crystal converts divergent incoming radiation into a single-mode output with higher brightness.

The output of the laser crystal is focused onto the surface of a recording medium to perform the imaging function. In ablation-type systems, the beam is focused on the "ablation layer" of the recording material, which is designed to volatilize in response to laser radiation; again, the depth-of-focus of the laser beam provides a degree of tolerable deviation. In transfer-type systems, the beam is focused on the transfer layer. As used herein, the term "plate" or "member" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement. Laser imaging is also widely used outside the context of lithography to produce, for example, color proofs and other graphic-arts products.

Practical imaging equipment requires lasers that respond nearly instantaneously to high-frequency square-wave power pulses so that imaging dots—that is, the spots produced by the laser beam on the recording material—appear as sharp, discrete, and ordinarily round shapes of consistent size. Dots must also be printed, or recording space left blank, at very closely spaced intervals to achieve typical print resolutions. Although the '470 application discloses the ability to control image-dot size by varying the pulse width within certain limits, it has been found that dot size can also change with the density at which dots are printed. The term "duty cycle" refers to the percentage of pixel locations in an imaged field that actually receive laser radiation (that is, the ratio of time during which the laser crystal is activated to the time it is inactive). The larger the duty cycle, the darker will be the resulting color, since in digital printing systems gray-scale densities or tints are achieved by varying pixel densities.

If the sizes of individual dots vary with the duty cycle, it will be impossible to establish consistent calibrations for color densities, since dot size also affects density. For example, if dots are smaller at low duty cycles, areas imaged at low pixel densities will print lighter than would be expected. And since documents typically contain regions of varying densities that may be interwoven in complex patterns, the problem cannot be corrected simply by altering the pixel density to correct for varying dot sizes.

A related imaging problem involves variation in distance between the laser output and the recording medium during the course of a scan. This is generally due to some mechanical misalignment in the imaging system, and tends to appear as a periodic condition (occurring, for example, due to eccentric rotation of the cylinder on which the recording medium is affixed during imaging). Although the underlying source of this problem lies in the mechanics of the imaging system rather than the response of the laser, variations in imaging distance and in laser power as a function of duty cycle tend to produce visually similar manifestations (in the form of varying spot sizes), and therefore create mutually reinforcing errors.

SUMMARY OF THE INVENTION

The present invention reduces or nearly eliminates variation in dot size across the spectrum of duty cycles (ranging generally from 1% to 100%—that is, from print densities spanning every hundredth pixel to every consecutive pixel) and as a consequence of distance variations. It should be stressed that the term "imaging" refers generally to permanent alteration to a recording medium, e.g., the affinity characteristics of a printing plate; in preferred implementations, imaging means ablation of a recording layer (in an ablation-type plate) or transfer of donor material to an acceptor sheet (in a transfer-type plate).

Although the preferred embodiment of the invention involves laser imaging of lithographic printing members, it is usefully applied to a wide variety of laser-recording systems involving various different kinds of graphic-arts constructions. Lasers amenable to correction in accordance with the present invention include, for example, diode lasers and diode-pumped crystal lasers. Diode lasers are solid-state devices (commonly termed semiconductor lasers and typically based on gallium aluminum arsenide or gallium aluminum indium compounds), and for imaging applications typically emit in the infrared (IR) or near-IR spectral region. The use of near-IR radiation facilitates use of a wide range of organic and inorganic absorption compounds and, in particular, semiconductive and conductive types.

Accordingly, in a first aspect, the invention provides means for electronically compensating for the effects of duty cycle on the output level of an imaging device. An exemplary apparatus includes a source of radiation (generally a laser) having an output level that varies both with an input power level and, undesirably, with the duty cycle. The apparatus also includes means for focusing the radiation onto a recording surface, and a power supply for driving the radiation source. In the case of a diode laser, the power supply delivers a variable current, the magnitude of which determines the power output of the laser. The radiation source is operated to produce, on the recording surface, an imagewise pattern of spots, and an adjustment facility alters the output of the power supply to compensate for output-level variations resulting from duty cycle—that is, from the recent pattern of laser activity.

Ordinarily, variation in power output with duty cycle reflects changes in the efficiency of operation that occur with inactivity. Particularly in the case of pumped-crystal lasers, which must undergo thermally induced configurational distortions in order to lase, periods of inactivity result in relaxation of the crystal and, consequently, diminished output. Accordingly, the invention utilizes the recent activity of the radiation source to identify correction factor appropriate to the pattern of activity. The correction factor, in turn, amplifies the input power level to an extent adequate to adjust for the expected diminution in output power. In a first embodiment, the invention includes an up-down counter that receives, as input, the same binary image data in serial form that is used to determine the state of the radiation source as it scans over a recording medium (causing actuation of the source only when adjacent to a location on the recording medium that is to be written). The counter increments during clock cycles when the radiation source is active, and decrements during inactive cycles. As a result, the state of the counter generally reflects the recent pattern of radiation-source activity, and its contents are used to address a list of correction values.

In a second embodiment, serial image data is applied to a shift register rather than a counter. This provides a more precise record of the pattern of recent activity, and the instantaneous contents of the register are once again used to address a list of correction values.

In a second aspect, the invention provides means for electronically compensating for the effects eccentric rotation on the output level of an imaging device. Generally, this aspect of the invention is usefully applied to a cylindrical imaging arrangement comprising a rotating cylinder on which the recording medium is mounted; a radiation source (which may comprise one or more lasers); a power supply for driving the radiation source; and means for drawing the radiation source axially along the cylinder, axial movement of the radiation source and rotation of the cylinder facilitating a scan of the radiation source over the cylinder-mounted recording medium. Eccentric rotation of the cylinder causes variations in the power density reaching the recording medium (notwithstanding the power actually exiting the radiation source), and an adjustment circuit compensates for these periodic increases and decreases in power.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
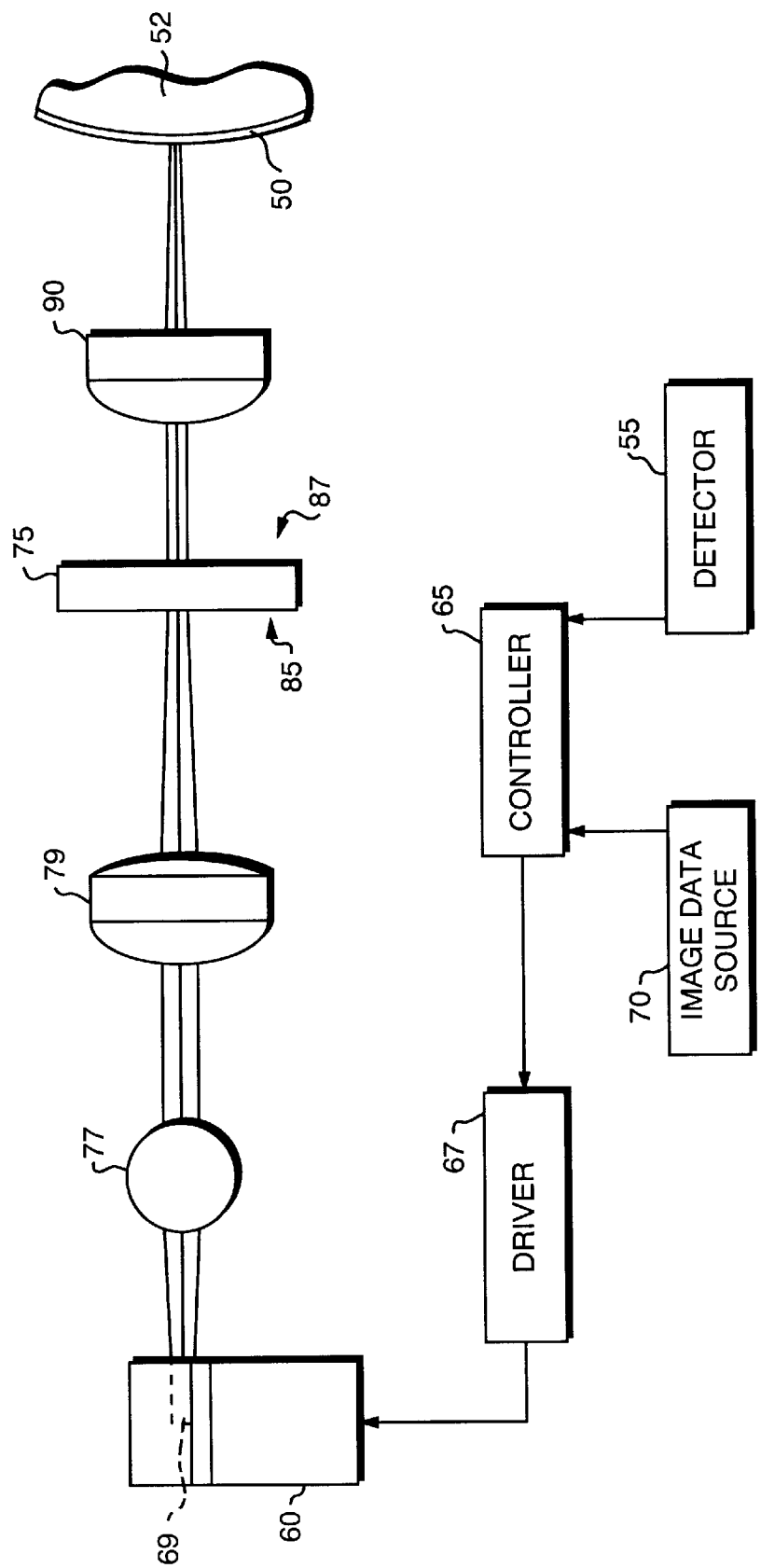
FIG. 1 schematically depicts a representative imaging environment to which the present invention is advantageously applied.

Refer first to FIG. 1, which schematically illustrates the basic components of an exemplary environment to which the invention may be applied. A recording medium 50, such as a lithographic plate blank or other graphic-arts construction, is affixed to a support during the imaging process. In the depicted implementation, that support is a cylinder 52, around which recording medium 50 is wrapped. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components of the invention, described hereinbelow, may be mounted in a writing head for movement on a lead screw and guide bar assembly that traverses recording medium 50 as it rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with one or more pumping laser diodes 60. The optical components discussed below concentrate the entire laser output onto recording medium 50 as a small feature, resulting in high effective power densities. A controller 65 operates a laser driver 67 to produce an imaging burst when the output slit 69 of laser 60 reaches appropriate points opposite recording medium 50; laser 60 may otherwise be maintained at a baseline, non-imaging energy level to minimize switching time. The driver preferably includes a pulse circuit capable of generating at least 40,000 laser-driving pulses/second, with each pulse being relatively short, i.e., on the order of microseconds.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of laser 60 and recording medium 50 (as reported by detector 55) with the image data to actuate the appropriate laser drivers at the appropriate times during scan of recording medium 50. The driver and control circuitry required to implement this scheme is well-known in the scanner and plotter art; suitable designs are described in the '092 patent and in U.S. Pat. No. 5,174,205, both commonly owned with the present application and hereby incorporated by reference.

The output of laser 60 pumps a laser crystal 75, and it is the emission of crystal 75 that actually reaches the recording medium 50. A series of lenses 77, 79 concentrate the output of laser 60 onto an end face 85 of crystal 75. Radiation disperses as it exits slit 69 of laser 60, diverging at the slit edges. Generally the dispersion (expressed as a "numerical aperture," or NA) along the short or "fast" axis shown in FIG. 1 is of primary concern; this dispersion is reduced using a divergence-reduction lens 77. A preferred configuration is a completely cylindrical lens, essentially a glass rod segment of proper diameter; however, other optical arrangements, such as lenses having hemispheric cross-sections or which correct both fast and slow axes, can also be used to advantage.

A focusing lens 79 focuses radiation emanating from lens 77 onto end face 85 of laser crystal 75. The optical path between lenses 77 and 79 may be direct, or may instead proceed through a fiber-optic cable. Lens 79 may, for example, be a bi-aspheric lens. Generally, end faces 85, 87 have mirror coatings that limit the entry of radiation other than that originating from the pumping source, and trap the output radiation. In this way, the two coatings facilitate the internal reflections characteristic of laser amplification while preventing the entry of spurious radiation. For example, each face 85, 87 may be provided with an HR coating that produces >99.8% reflection of 1064 nm (output) radiation and 95% transmission of 808 nm (input) radiation, and an R coating that produces 95% (ñ0.5%) reflection of 1064 nm radiation and >95% transmission of 808 nm radiation.

The highly collimated, low-NA output of crystal 75 is, finally, focused onto the surface (or an appropriate inner layer) of recording medium 50 by a lens 90, which may be a plano-convex lens (as illustrated) or other suitable optical arrangement. The laser, laser crystal and optical components are normally carried in a single elongated housing. Recording medium 50 responds to the imaging radiation emitted by crystal 75, e.g., through ablation of an imaging layer or by non-ablative transfer of material from a donor to an acceptor sheet.

The function of laser crystal 75 is to produce a low-NA laser output without excessive loss of energy from laser 60; essentially, the lost energy represents the price of increased depth-of-focus. Generally, crystal 75 is preferably (although not necessarily) a flat-flat monolith of "thermal lensing" material; optical power delivered to end face 85 causes faces 85, 87 to deflect in a bowing fashion, creating a resonator cavity that facilitates lasing. To create a smooth imaging spot, it is desirable to obtain a single transverse mode of operation (preferably the lowest-order, fundamental $TEM_{00}$ mode), with the output divergence as close as possible to that of a diffraction-limited source.

Figure 2:
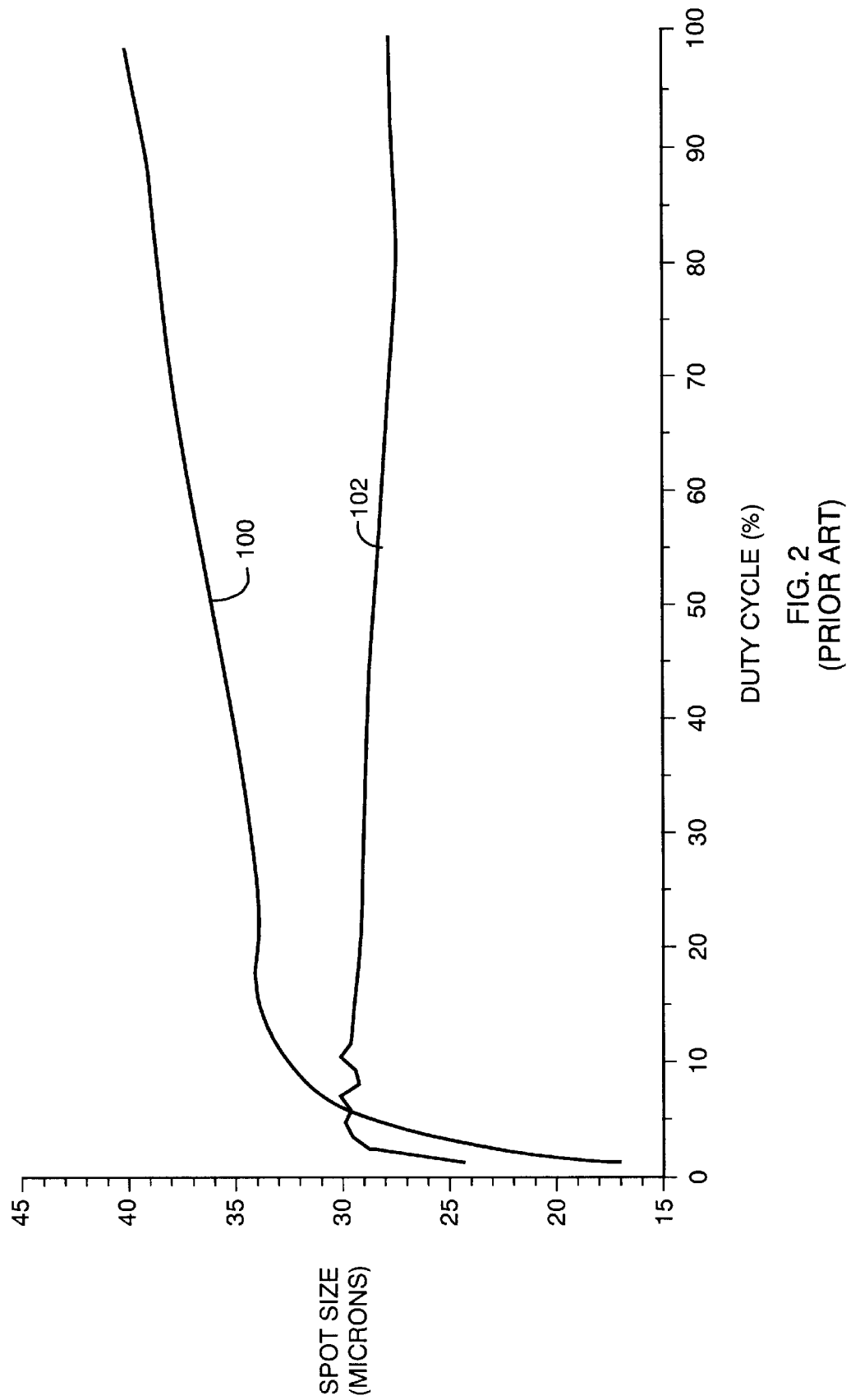
FIG. 2 shows the variation in spot size with duty cycle in a conventional (prior art) laser-crystal arrangement.

The behavior of a conventionally operated laser crystal in the above-described arrangement is depicted in FIG. 2. The graph 100 illustrates variation of spot size with duty cycle for a 2 mm-thick, $Nd:YVO_4$ crystal doped to a 5% concentration, while the graph 102 illustrates this variation for a 1 mm crystal. In both cases, the spot size changes substantially at low duty cycles and gradually over the remainder of the range. These variations are sufficient to alter the printed tints significantly relative to what would be expected (for a consistent spot size).

Figure 3B:
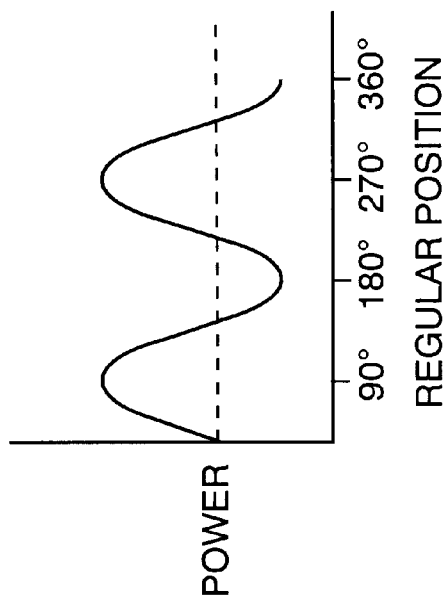
FIG. 3A is an elevational schematic illustrating how eccentric rotation of a cylinder can cause variation in distance between a writing head and the cylinder surface, and FIG. 3B graphically depicts effect on spot size during a complete rotation of the cylinder.
Figure 3A:
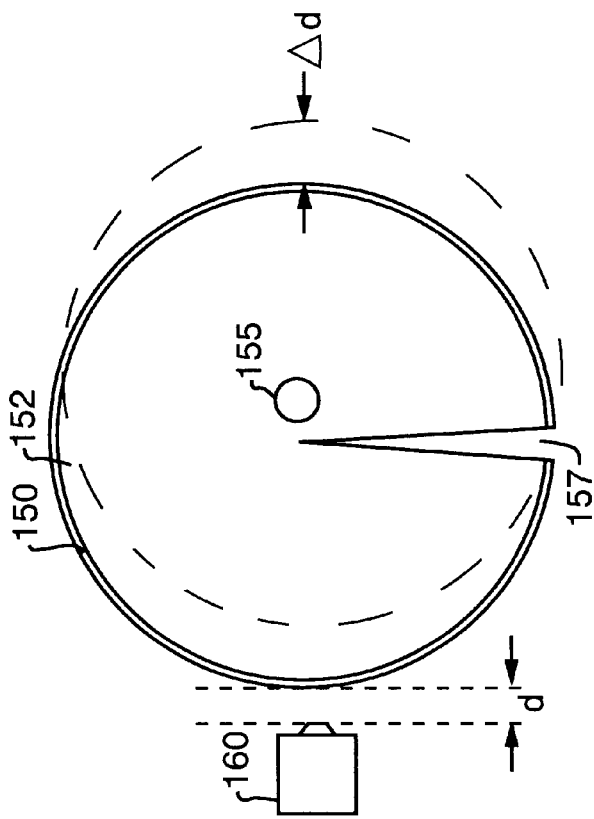

FIG. 3A illustrates the manner in which eccentric displacement leads to variation in the power delivered to a cylindrically mounted recording medium 150. The cylinder 152 rotates on a shaft 155 that is displaced slightly from center, and has a void segment 157 within which the edges of recording medium 150 are pinned. As a result of the displacement, the distance d between the a writing head 160 and the recording medium 150 varies by an amount Δd due to the eccentricity of rotation. Although the typical magnitude of the eccentricity is exaggerated in the figure for descriptive purposes, even very small deviations produce perceptible variations in applied image-spot densities, since the radiation flux density actually reaching the recording medium 150 falls of with the square of the distance. FIG. 3B illustrates generally the manner in which the effective power at the surface of medium 150 varies as cylinder 152 rotates (assuming, for purposes of illustration, that 0° of rotation corresponds to the midpoint of the eccentricity excursion or "run out" Δd). The effect is a sinusoidal increase and decrease in power as cylinder 152 rotates.

Figure 4A:
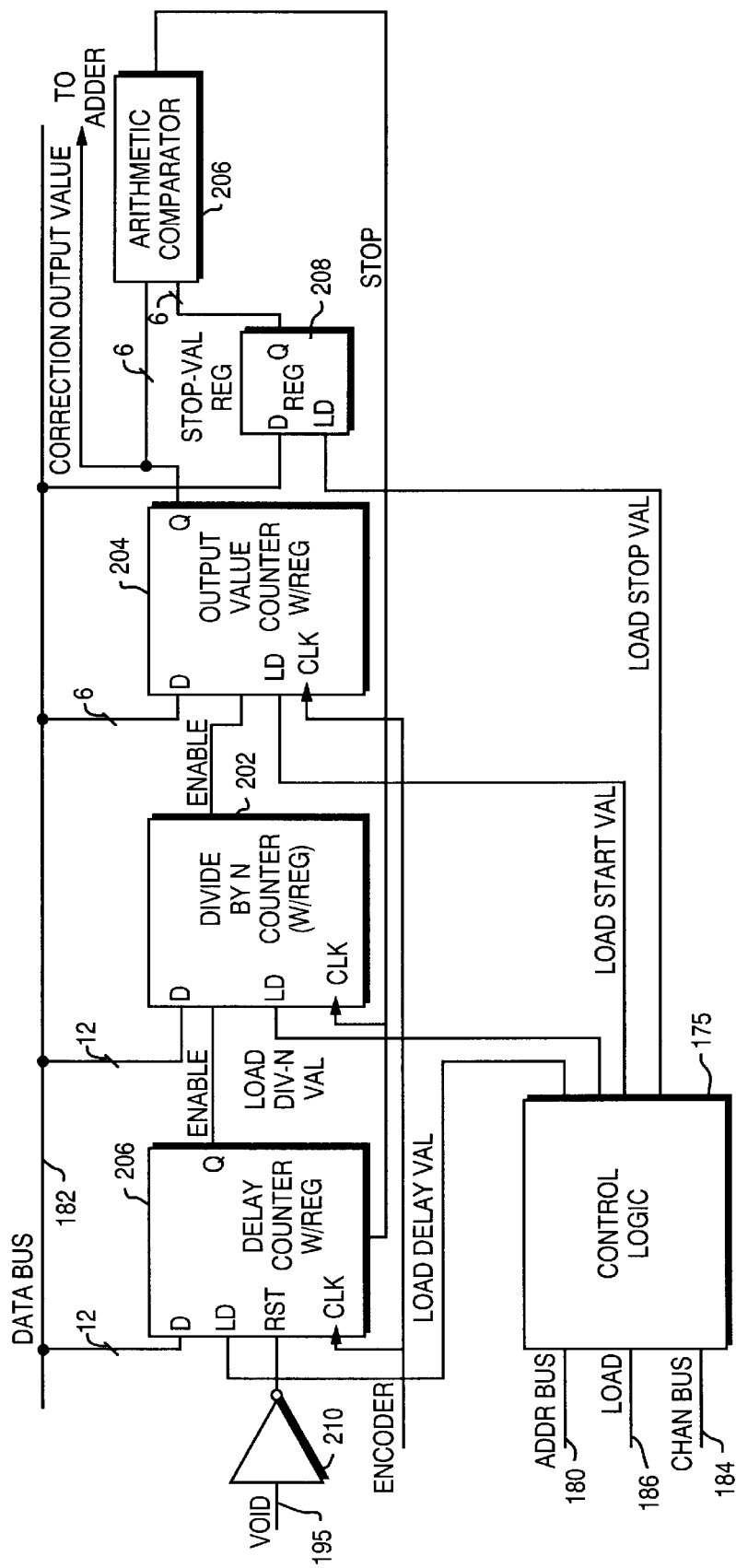
FIG. 4A is a schematic of a circuit that corrects for-power variations owing to eccentric rotation of a cylinder.
Figure 4B:
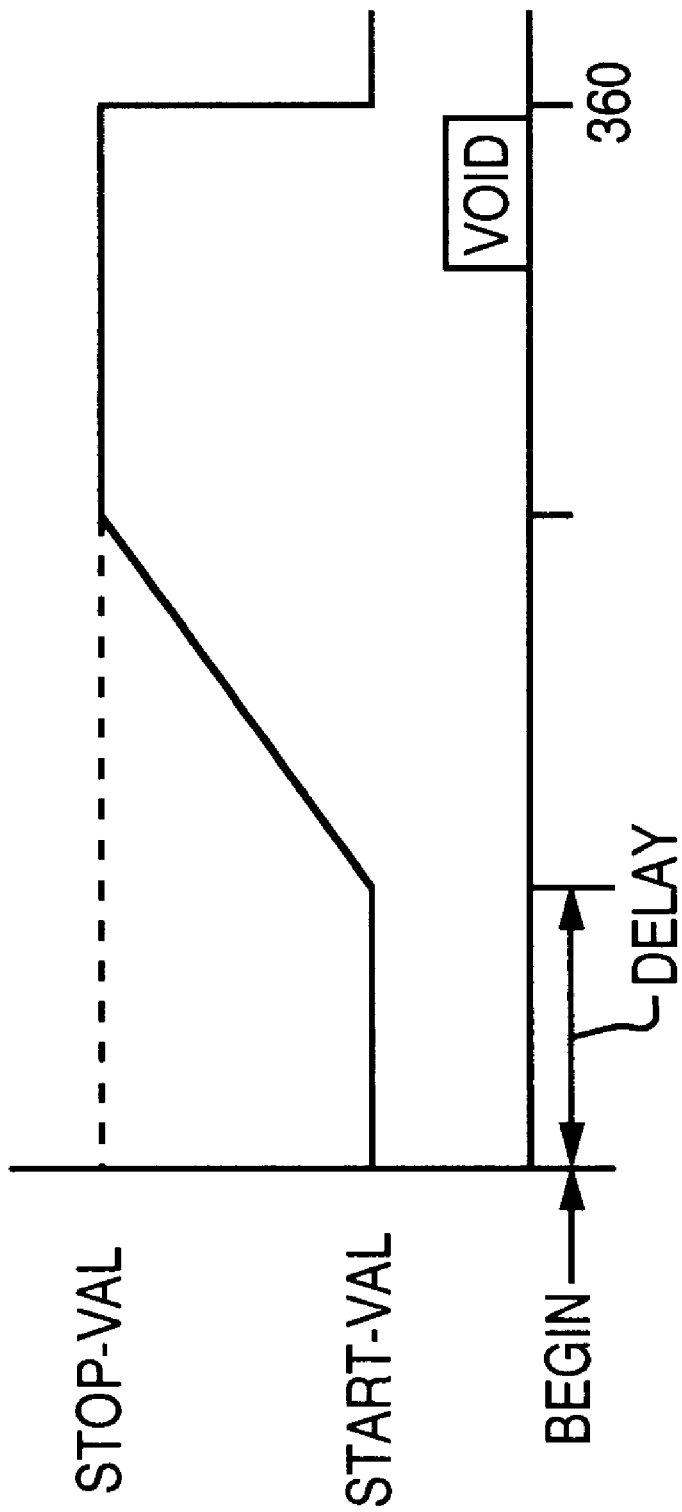
FIG. 4B graphically depicts the correction function implemented by the circuit of FIG. 4A.

A circuit providing compensation for the effects of eccentric rotation is shown in FIG. 4A, and its operation illustrated in FIG. 4B. With reference to the latter figure, the purpose of the circuit is to compensate for power variation in a simplified fashion. Because in practice only 60–70% of the circumferential extent of cylinder 150 represents imageable area, a one-way linear correction (e.g., an increase in power applied between 135° and 225° against the function shown in FIG. 3B) is generally adequate. This form of correction is illustrated in FIG. 4B. During the DELAY segment of rotation, from 0° to 135°, the current adjustment provided to laser driver 67 is maintained at a START VALUE. This digital value will be zero if an increase in power is desired. At the end of the delay distance (or angle), the adjustment current is incremented once every N encoder pulses (each pulse representing a discrete angular displacement, as discussed below) until the additional current reaches the STOP VALUE. The adjustment current remains at the STOP VALUE until void segment 157 has once again fully passed by writing head 160, at which point the adjustment current once again drops to the START VALUE. If a decrease rather than an increase in laser power is desired, then the START VALUE will be some positive amount of added current and the STOP VALUE will be zero. The adjustment current is added to existing corrections, such as a bias current and correction for duty cycle-based power variation.

This is a digital value representing the unmodified, default current level, and may be greater than zero in order to provide a bias that facilitates rapid switching of the laser crystal 75 into an emitting state. The STOP VALUE, attained when eccentricity has maximally increased the distance d at 180°, represents the maximum correction—i.e., increase in driver current-which is maintained throughout the remainder of rotation. The slope of the correction line determines how fast the correction is applied (that is, the angular distance through which cylinder 152 rotates during correction). When the void segment 157 has fully passed by writing head 160, the applied current is reset to the START VALUE.

The circuit shown in FIG. 4A is integrated within controller 65, the remaining logic circuitry, memory and registers of which are representatively indicated at 175. Controller 65 includes an address bus 180, which is connected to the various registers and memory to facilitate access to specific data locations therein. These components are also connected to a data bus 182, which facilitates the interchange and propagation of data thereamong. A channel bus 184 allows selection of particular laser devices, each of which, as discussed below, typically has its own associated operating and logic circuitry. A LOAD line 186 allows the user to provide, via an interface (not shown), various parameter values that are stored in the memory (i.e., RAM, EPROM, Flash ROM, or some combination) of control logic 175. An ENCODER line 190 receives data from the shaft encoder of detector 55. A VOID line 195 receives a signal when void 157 is opposite writing head 160 (see FIG. 3A); that is, the VOID signal is true during the interval within rotation of cylinder 152 brings writing head 160 in opposition to void 157, and is false through the rest of the rotation cycle.

The eccentricity-compensation circuit includes a delay counter 200, a divide-by-N counter 202, an output-value counter 204, and arithmetic comparator 206, and a stop-value register 208 that holds the STOP VALUE level. Counters 200, 202, 204 also include internal data registers. These registers, as well as stop-value register 208, receive their contents via data bus 182. All of the foregoing components can be implemented as discrete devices or as multidevice circuits.

The clock terminal of counters 200, 202, 204 is driven by signals from ENCODER line 190. Each encoder pulse represents rotation of the cylinder 152 by a fixed, minuscule angular increment. Consequently, the operating cycles of the counters are keyed to the position of the cylinder rather than intervals of time. The Q output of delay counter 200 is connected to the ENABLE terminal of divide-by-N counter 202, and the output of this device is provided to the ENABLE terminal of output-value counter 204. The multiple-bit output of output-value counter 204 represents the data used for correction—i.e., to modify the power that driver 67 applies to laser 60 (see FIG. 1). Accordingly, and as set forth in greater detail below, this data may be combined directly with pre-existing driver data or, in addition, with data generated by a circuit compensating for duty cycle-based power variations. The output of counter 204 is also applied to arithmetic comparator 206, which compares the value with the value in stop-value register 208, and issues a STOP signal to delay counter 200 when the two values are equal.

The value in the register of delay counter 200 represents the DELAY segment shown in FIG. 4B, i.e., rotation by cylinder 152 prior to the onset of correction. The value N in the register of divide-by-N counter 202 dictates the slope of the correction line—that is, the rate at which correction is applied. Following the DELAY segment, divide-by-N counter 202 issues an ENABLE signal to output-value counter 204 after each N encoder pulses, causing the correction output value to increment by one; accordingly, the slope of the correction line is equal to 1/N. The numerical significance of each unit correction increment is determined by the manner in which the correction output value is employed, as described in greater detail below.

In operation, control logic 175 initializes the circuit by loading values into the internal registers of counters 200, 202, 204, and into counter 208. For each of these components, control logic 175 places the appropriate value on data bus 182 and issues a LOAD signal, causing the designated component (and only that component) to load the contents of the data bus. Cylinder 152 begins to rotate, reaching a steady speed at which imaging can begin. When rotation brings void segment 157 past writing head 160, the VOID signal goes false and its inverse, applied to the RESET terminal of counter 200 by an inverter 210, causes the counter to begin counting. During this time, divide-by-N counter 202 is disabled, so no correction output value is applied. When delay counter 200 reaches the value stored in its register—corresponding to completion of the delay segment—its output Q goes high, enabling divide-by-N counter 202. After each set of N encoder pulses, divide-by-N counter 202 issues an ENABLE signal to output-value counter 204, which increments and places its current value at its output terminals. This process continues until the correction value output reaches the value stored in stop-value register 208. At this point, comparator 206 issues a STOP signal to delay counter, clearing it. The inverted VOID signal prevents counter 200 from counting until the void segment 157 has passed writing head 160.

Of course, more elaborate correction schemes are also possible. For example, if the function shown in FIG. 3B is well characterized, its inverse can be programmed in software stored in controller 65, and applied directly to the START VALUE level through an adder (the output of which may, for example, drive a digital-to-analog converter), the output of which determines the output current of driver 67. It should also be noted that the degree of eccentric rotation can vary along the axis of cylinder 152—that is, the cylinder's rotation can exhibit not only eccentricity but yaw. In this case, the power function would be three-dimensional (represented, for example, by a separate power curve as shown in FIG. 3B for each circumferential pass of writing head 160 over the surface of cylinder 152). In this case, it is possible (although cumbersome) to develop a bitmap pedigree for the cylinder, with each imageable point associated with a powercorrection level that is retrieved from memory and applied along with the corresponding image data.

Correction for eccentricity can be implemented by, for example, adding the correction output value to the START VALUE and applying the sum to a digital-to-analog converter, the output of which, once again, determines the output current of driver 67. If necessary, the unit increments of the correction output value can be scaled using a multiplier (so that each unit correction corresponds to a meaningful amount of current).

Figure 5:
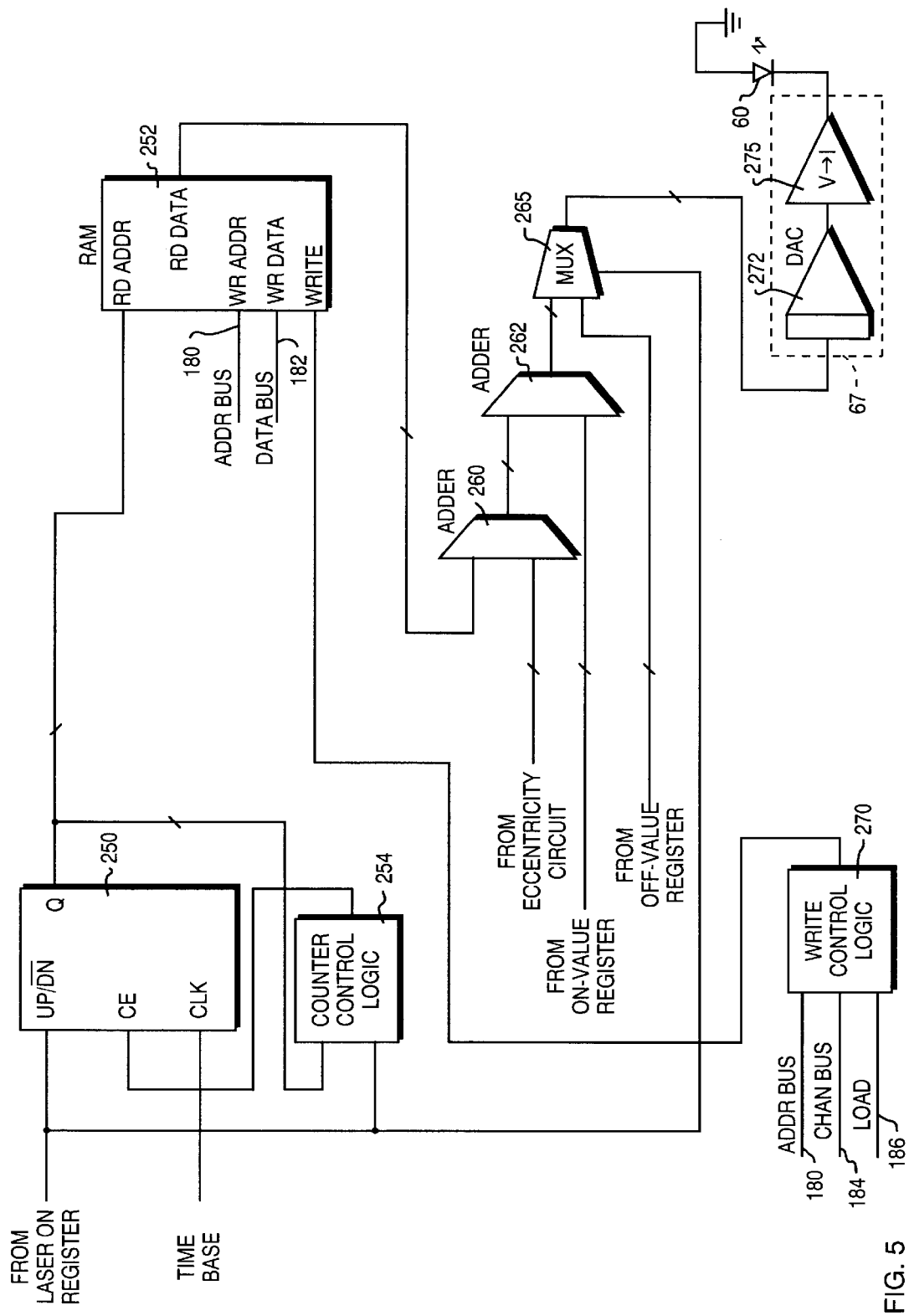
FIG. 5 is a schematic of a circuit that corrects for power variations owing to variations in duty cycle.
Figure 6:
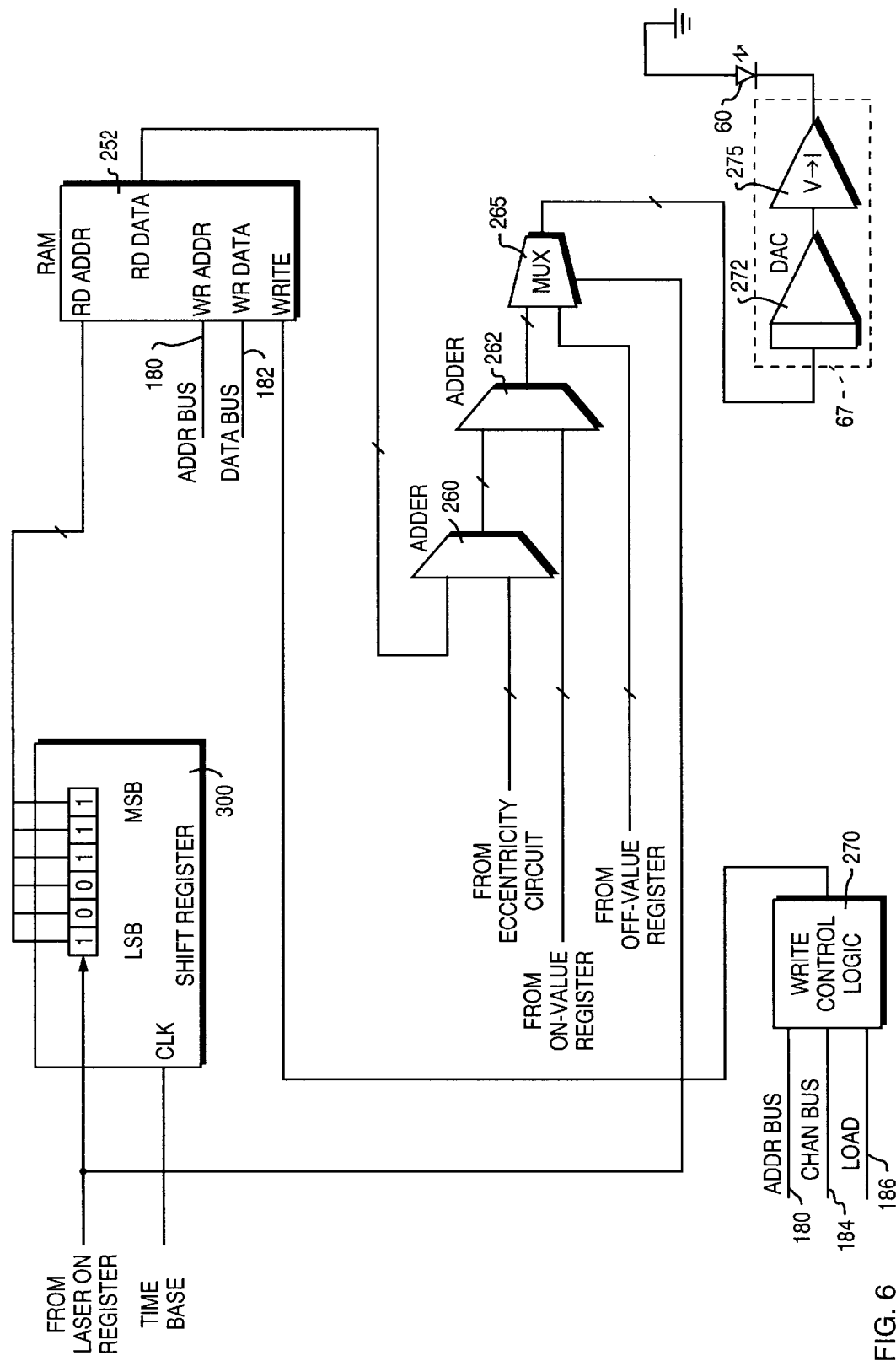
FIG. 6 is a schematic of an alternative to the circuit shown in FIG. 5.

Preferably, the correction output value is combined with correction for power variation as a function of duty cycle as shown in the circuits of FIGS. 5 and 6 (either of which is designed to accommodate a single laser, so multiple-laser systems require a corresponding number of separate circuits). The operative concept behind each of these circuits stems from the recognition that duty cycle-based power variation stems from the reduction in laser efficiency that accompanies intervals between laser firings; beyond a threshold period of inactivity, a given current to laser driver 67 produces a diminished output, the extent of the diminution depending on the duration of the interval. Accordingly, in both circuits, correction values are stored in a random-access memory (RAM), and the particular value applied at a given juncture is determined by the manner in which the laser has previously been operated. The output variation is a nonlinear function of duty cycle, so a correction circuit cannot simply multiply a default current setting by a proportional correction value.

With reference to FIG. 5, the illustrated circuit utilizes the contents of a series of flags and registers located in control logic 175 (see FIG. 4A). A LASER-ON flag indicates whether laser 60 is active or inactive. An ON VALUE register contains data specifying the default (uncorrected) current level to be applied by driver 67 in order to activate laser 60, and an OFF VALUE register contains data specifying the current level to be applied to laser 60 when the laser is not firing. Once again, and as indicated in the '470 application, that current level is typically positive in order to maintain crystal 75 (see FIG. 1) in an output-ready state. Thus, the LASER-ON flag is high when the laser is activated with the ON VALUE (or a modified ON VALUE) current level, and is low when the laser receives the current level specified in the OFF VALUE register.

The depicted circuit includes an up-down counter 250; a limit logic circuit 252; a RAM (implemented as a discrete device or as a data partition in the main controller memory) 254 for holding an ordered list of correction values; a pair of adders 260, 262; a multiplexer 265; and a write-control logic circuit 270. Laser driver 67 comprises a digital-to-analog converter (DAC) and a voltage-controlled current source 275.

The LASER-ON flag is connected to the input terminal of up-down counter 250. Thus, on each clock pulse, the state of the LASER-ON flag determines whether counter 250 increments or decrements. (The effect is the same as if the input terminal were connected directly to image data source 70 (see FIG. 1).) The output of up-down counter 250 reflects the state of the internal counting register and comprises a plurality of bits. This output is provided to counter control logic 254 and to the address lines of RAM 252. An output of counter control logic 254 is connected to the CHIP ENABLE terminal of up-down counter 250. When the output of up-down counter 250 reaches a maximum, counter control logic 254 asserts a signal to prevent up-down counter 250 from incrementing if the LASER ON flag is true at the next clock pulse; similarly, when the output of up-down counter 250 falls to zero, counter control logic 254 asserts a signal to prevent up-down counter 250 from decrementing if the LASER ON flag is false at the next clock pulse.

By virtue of its connection to RAM 252, the output of up-down counter 250 functions to select the address of the appropriate correction value stored in the RAM. Thus, an n-bit counter can select among $2^n$ correction values. These values are placed in RAM 252 by write-control logic circuit 270, which may include nonvolatile storage and/or provision for interface to an operator. For example, the array of correction values may vary depending on the material being imaged; alternatively, a user interface may be provided with a graphical "slider switch" that the user controls to vary the level of correction, and which operates to vary a series of default values in RAM 252 according to user selection. Write-control logic circuit 270 receives data via LOAD line 186. A single such logic circuit may be used to program a plurality of RAMs, each corresponding to a different laser device, using channel bus 184.

If correction for duty cycle is to be combined with correction for eccentricity, the is data selected from RAM 252 by the output of up-down counter 250 and the correction value from the circuit shown in FIG. 4A are applied to adder 260, which adds them to derive a composite correction level. This value is applied to adder 262, which adds the correction level to the default ON VALUE. Multiplexer 265 receives as its inputs the output of adder 262 and the contents of the OFF VALUE register. The output of multiplexer 265 is applied to laser driver 67. When the LASER-ON flag is high, multiplexer 265 places the corrected ON VALUE on its output terminals; when the LASER-ON flag is low, multiplexer 265 places the OFF VALUE on its output terminals.

To understand the operation of this circuit, consider a four-bit up-down counter 250; that is, the Q output varies from 0–15. Each of these output values corresponds to a correction value stored in RAM 252 and addressable by the output of up-down counter 250. Each output value also represents a previous pattern of laser firing, which dictates the magnitude of the necessary correction value. At the extremes, a value of zero suggests that the laser has been fired infrequently, if at all, during the last 15 clock cycles (i.e., during the last 15 angular increments around cylinder 152); as a result, maximum correction would be necessary, so the highest correction value corresponds to a zero output of up-down counter 250. A value of 15 suggests that the laser has been fired very frequently during the previous 15 clock cycles, so the correction value is zero. In between, values are chosen to reflect the nonlinearity of the laser response function. These values may be determined routinely from inspection of the print dots resulting from various combinations of laser activations and inactivations, the correction values being chosen to eliminate or at least substantially reduce discrepancies in dot size resulting from the different combinations.

One problem with this approach is the fact that it does not directly reflect the history of the laser firing pattern; that is, different patterns of activations and inactivations can produce the same output from up-down counter 250, since its output reflects no more than the overall results of the last 15 (in the case of a four-bit output) firing possibilities. For example, a sequence of 10 firings following by five non-firings produces the same counter output as a sequence of five non-firings followed by 10 firings. The two situations may not call for identical correction amounts, since in the former case the laser has been inactive for five clock cycles while in the latter case the laser has been continuously active for 10 cycles. If the behavior of the laser depends more finely on the pattern of firings and non-firings than is captured by a general "look-back" at the last 15 cycles, an approach with greater accuracy is required.

A circuit implementnig such an approach is illustrated in FIG. 6. Instead of an up-down counter and control logic therefor, the circuit contains a shift register 300. The size of shift register 300-that is, the number of its internal single-bit memory cells, which range from a most recent (least significant) bit LSB to a least recent (most significant) bit MSB-corresponds to the number of previous clock cycles employed to determine a correction value, because the contents of shift register 300 are used to address the contents of RAM 252. That is, the data lines of shift register 300 are connected to the address lines of RAM 252, and therefore directly select the correction value for each clock cycle. Each clock cycle shifts the contents of shift register 300, which therefore maintains an exact record of the laser activation pattern for as many previous clock cycles as the register has bits. In the illustrated embodiment, shift register 300 is shown with six bits. This size is adequate if a six-cycle history is sufficient to determine the amount of correction necessary in all circumstances; if, for example, the laser reaches maximum inefficiency after six cycles of inactivity, more than six cycles of activity history is unnecessary to determine a correction value, so a six-bit shift register is adequate. If shift register 300 is n bits long, RAM 252 contains $2^n$ correction values. Naturally, the price of the greater accuracy provided by this approach is the larger number of correction entries and address lines.

It will therefore be seen that the foregoing approaches to correction for powerdensity variation in an imaging system are both versatile and readily implemented. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for imaging a recording construction, the apparatus comprising:
    a. a source of radiation having an output level varying with an input power level and with a duty cycle;
    b. means for focusing the radiation onto a surface of the recording construction;
    c. a source of power coupled to the radiation source to provide the input power;
    d. means for operating the radiation source to produce, on the surface, an imagewise pattern of spots; and
    e. means for adjusting the power source to compensate for output-level variations arising from variations in duty cycle.

2. The apparatus of claim 1 wherein the radiation source comprises a laser and the operating means comprises:
    a. means for receiving a series of data values each associated with a location and specifying a laser output level;
    b. means for causing relative movement between the laser and the surface to effect a scan of the surface; and
    c. means for actuating the laser in accordance with the data values at corresponding locations on the surface, the adjusting means being responsive to a current data value and a plurality of previous data values.

3. The apparatus of claim 2 wherein the data are binary digits corresponding to an activity state of the laser, the adjusting means comprising:
    a. a computer memory comprising a series of stored correction values; and
    b. an up-down counter connected to the computer memory and having a state responsive to the data, the state of the counter specifying one of the correction values, the adjusting means adjusting the power source in accordance with the specified correction value.

4. The apparatus of claim 3 further comprising a control logic circuit for setting a maximum number of data values upon which the state of the counter is based.

5. The apparatus of claim 2 further comprising:
    a. a cylinder for bearing the surface;
    b. means for rotating the cylinder, the rotation having an eccentricity;
    c. means for moving the laser axially, the scan being effected by rotation of the cylinder and axial movement of the laser, the eccentricity causing variations in laser power density reaching the surface,
the adjusting means adjusting the power source to compensate for the eccentricity-caused power-density variations as well as the output-level variations arising from variations in duty cycle.

6. The apparatus of claim 2 wherein the data are binary digits corresponding to an activity state of the laser, the adjusting means comprising:
    a. a computer memory comprising a series of stored correction values; and
    b. a shift register having contents that comprise the plurality of previous data values, the shift register being connected to the computer memory and the contents of the shift register specifying one of the correction values, the adjusting means adjusting the power source in accordance with the specified correction value.

7. Apparatus for imaging a laser-responsive recording construction, the apparatus comprising:
    a. a cylinder for bearing the recording construction;
    b. a source of radiation having an output level varying with an input power level;
    c. means for focusing the radiation onto a surface of the recording construction;
    d. a source of power coupled to the radiation source to provide the input power;
    e. means for rotating the cylinder, the rotation having an eccentricity;
    f. means for moving the radiation source axially so as to effect a scan over the rotating cylinder, the eccentricity causing variations in power density reaching the recording surface;
    g. means for operating the radiation source to produce, on the recording surface, an imagewise pattern of spots; and
    h. means for adjusting the power source to compensate for the eccentricity-caused power-density variations.

8. A method of imaging a recording construction, the method comprising the steps of:
    a. providing a source of radiation having an output level varying with an input power level and with a duty cycle;
    b. focusing the radiation onto a surface of the recording construction;
    c. operating the radiation source to produce, on the recording surface, an imagewise pattern of spots; and
    d. adjusting the input power level to compensate for output-level variations arising from variations in duty cycle.

9. The method of claim 8 wherein the radiation source comprises a laser and the operating step comprises:

a. receiving a series of data values each associated with a location and specifying a laser output level;

b. causing relative movement between the laser and the surface to effect a scan of the surface; and c. actuating the laser in accordance with the data values at corresponding locations on the surface, the adjusting step being based on a current data value and a plurality of previous data values.

10. The method of claim 9 wherein the data are binary digits corresponding to an activity state of the laser, the adjustment step comprising:

a. providing a computer memory comprising a series of stored correction values;

b. providing an up-down counter connected to the computer memory and having a state responsive to the data, the state of the counter specifying one of the correction values; and c. adjusting the power source in accordance with the specified correction value.

11. The method of claim 10 further comprising the step of setting a maximum number of data values upon which the state of the counter is based.

12. The method of claim 9 further comprising the steps of:

a. providing a cylinder for bearing the surface;

b. rotating the cylinder with some eccentricity;

c. moving the laser axially, the scan being effected by rotation of the cylinder and axial movement of the laser, the eccentricity causing variations in laser power density reaching the surface, the adjustment step compensating for the eccentricity-caused power-density variations as well as the output-level variations arising from variations in duty cycle.

13. The method of claim 9 wherein the data are binary digits corresponding to an activity state of the laser, the adjustment step comprising:

a. providing a computer memory comprising a series of stored correction values;

b. storing the plurality of previous data values as a temporally ordered list and, as a new data value is received, adding it to the list and shifting the oldest value out of the list, the values of the list specifying one of the correction values; and c. adjusting the power source in accordance with the specified correction value.

14. A method of imaging a laser-responsive recording construction, the method comprising the steps of:

a. providing a cylinder for bearing the recording construction;

b. providing a source of radiation having an output level varying with an input power level;

c. focusing the radiation onto a surface of the recording construction;

d. rotating the cylinder with some eccentricity;

e. moving the radiation source axially so as to effect a scan over the rotating cylinder, the eccentricity causing variations in power density reaching the recording surface;

f. operating the radiation source to produce, on the recording surface, an imagewise pattern of spots; and g. adjusting the input power level to compensate for the eccentricity-caused power-density variations.

15. The method of claim 14 wherein the eccentricity-caused power-density variations follow a periodic function, the adjustment step comprising applying an inverse of the periodic function to the input power level.

16. The method of claim 14 wherein the eccentricity caused power-density variations themselves vary axially along the cylinder, the adjustment step comprising varying the adjustment with axial movement of the radiation source.

17. The method of claim 16 wherein, for each pass of the radiation source over the cylinder, the eccentricity-caused power-density variations follow a periodic function, the adjustment step comprising applying, for each pass, an inverse of the periodic function to the input power level.

* * * * *